US012638764B1

(12) United States Patent

Hicks

(10) Patent No.: US 12,638,764 B1
(45) Date of Patent: May 26, 2026

(54) CAMERA OPTICAL QUALITY MAINTENANCE SYSTEMS AND METHODS

(71) Applicant: MAGNA ELECTRONICS, LLC, Southfield, MI (US)

(72) Inventor: Samantha Hicks, Beverly Hills, MI (US)

(73) Assignee: MAGNA ELECTRONICS, LLC, Southfield, MI (US)

( * ) Notice: Subject to any disclaimer, the term of this patent is extended or adjusted under 35 U.S.C. 154(b) by 0 days.

(21) Appl. No.: 18/959,459

(22) Filed: Nov. 25, 2024

(51) Int. Cl.
| | |
|---|---|
| *G03B 43/00* | (2021.01) |
| *B60R 11/04* | (2006.01) |
| *G01M 11/02* | (2006.01) |

(52) U.S. Cl.
CPC .............. *G03B 43/00* (2013.01); *B60R 11/04* (2013.01); *G01M 11/0257* (2013.01)

(58) Field of Classification Search
CPC ..... G03B 43/00; B60R 11/04; G01M 11/0257
USPC ........................................................ 348/187
See application file for complete search history.

(56) References Cited

U.S. PATENT DOCUMENTS

| | | | |
|---|---|---|---|
| 9,307,230 B2 | 4/2016 | Wu et al. | |
| 10,013,616 B2 * | 7/2018 | Gehrke | G06F 18/24 |
| 12,319,246 B2 * | 6/2025 | Alismail | G06T 7/11 |
| 12,322,115 B2 * | 6/2025 | Aluru | G06T 7/0002 |
| 2011/0032413 A1 * | 2/2011 | Kulkarni | G03B 13/36 |
| | | | 348/E5.045 |
| 2022/0242452 A1 * | 8/2022 | Oboril | B60W 60/0016 |
| 2023/0127692 A1 * | 4/2023 | Bigioi | B60R 1/12 |
| | | | 348/148 |

* cited by examiner

*Primary Examiner* — Michael E Teitelbaum
*Assistant Examiner* — Omer Khalid

(57) ABSTRACT

A camera system of a vehicle includes: a camera within a passenger cabin of the vehicle and configured to capture an image including an occupant of a seat within the passenger cabin; a straight edge detection module configured to detect a straight edge in the image; a score module configured to determine a score for the straight edge, the score corresponding to an optical quality of the camera; and an action module configured to take one or more actions when the score is less than a predetermined value.

19 Claims, 8 Drawing Sheets

504

508

512

516

520

CAMERA OPTICAL QUALITY MAINTENANCE SYSTEMS AND METHODS

FIELD

The present disclosure relates to passenger cabin monitoring systems and methods for vehicles and more particularly to systems and methods for determining and maintaining optical quality of cameras of vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles can be used for individual use (e.g., by the same one or more people) or for shared use by many different people. Rideshare systems allow users to request transportation from a pick-up location to a drop-off location.

Vehicles may be human-operated or autonomous vehicles (e.g., cars, vans, buses, bicycles, motorcycles, etc.). Examples of autonomous vehicles include semi-autonomous and fully autonomous vehicles. Human operated vehicles are controlled by a human using input devices, such as a steering wheel, an accelerator pedal, and a brake pedal.

SUMMARY

In a feature, a camera system of a vehicle includes: a camera within a passenger cabin of the vehicle and configured to capture an image including an occupant of a seat within the passenger cabin; a straight edge detection module configured to detect a straight edge in the image; a score module configured to determine a score for the straight edge, the score corresponding to an optical quality of the camera; and an action module configured to take one or more actions when the score is less than a predetermined value.

In further features, the score module is configured to determine the score based on parameters of the straight edge.

In further features, the parameters include a pixel resolution of the straight edge.

In further features, the parameters include an angle of the straight edge.

In further features, the parameters include a contrast ratio of pixels across the straight edge.

In further features, the contrast ratio is between (a) a first pixel on one side of the straight edge and (b) a second pixel on the other side of the straight edge.

In further features, the first and second pixels form a line that intersects the straight edge at one point.

In further features, the line is perpendicular to the straight edge.

In further features, the score module is configured to determine the score for the straight edge in response to a determination that the straight edge satisfies predetermined conditions.

In further features, one of the predetermined conditions includes a pixel resolution of the straight edge being greater than a predetermined resolution.

In further features, one of the predetermined conditions includes an angle of the straight edge being within a predetermined angle range.

In further features, one of the predetermined conditions includes a contrast ratio across the straight edge being greater than a predetermined ratio.

In further features, the action module is configured to, when the score is less than the predetermined value, visually output an indicator of a fault on a display.

In further features, the action module is configured to, when the score is less than the predetermined value, audibly output an indicator of a fault via a speaker.

In further features, the action module is configured to, when the score is less than the predetermined value, turn on an indicator light visible within a passenger cabin of the vehicle.

In further features, the action module is configured to, when the score is less than the predetermined value, disable autonomous navigation of the vehicle.

In further features, the camera is an infrared (IR) camera.

In further features, the score module is configured to determine the score using one or more equations that relate parameters of the straight edge to scores.

In further features, the score module is configured to determine the score using one or more lookup tables that relate parameters of the straight edge to scores.

In a feature, a camera optics method for a vehicle includes: by a camera within a passenger cabin of the vehicle, capturing an image including an occupant of a seat within the passenger cabin; detecting a straight edge in the image; determining a score for the straight edge, the score corresponding to an optical quality of the camera; and taking one or more actions when the score is less than a predetermined value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

One or more camera systems may be integrated into a vehicle once the vehicle is built. For example, a driver facing camera may be integrated into a passenger cabin of the vehicle during assembly of the vehicle on a production line. The driver facing camera may be used after assembly for various purposes, such as driver monitoring (e.g., autonomous driving may be disabled when the driver is not looking at the road in front of the vehicle). One or more items (e.g., a lens, filter, etc.) may cover a camera system of the vehicle and may occlude the camera.

The present application involves determining an optical quality of a camera system (e.g., a driver facing camera) after integration into a vehicle, such as during assembly and before the vehicle is first sold. The optical quality is determined based on parameters of a straight edge satisfying one or more predetermined conditions captured in an image by the camera. One or more actions may be taken when the optical quality is low (e.g., less than a predetermined value), such as indicating that a fault is present with the camera, an indication to clean the camera, disabling autonomous driving, etc.

Figure 1:
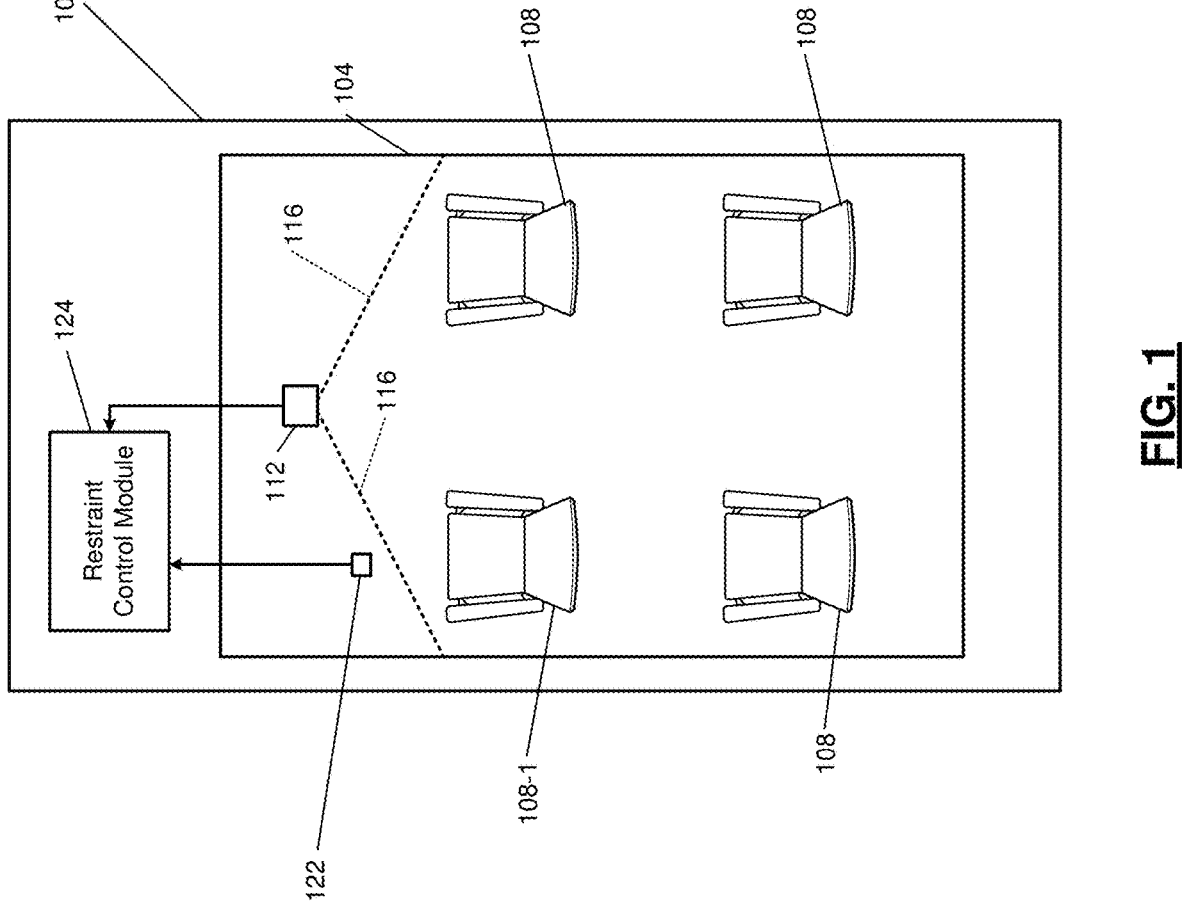
FIGS. 1-3 are functional block diagrams of example systems of a vehicle.

FIG. 1 is a functional block diagram of an example system of a vehicle 100. The vehicle 100 includes a passenger cabin 104. The vehicle 100 also includes one or more propulsion devices, such as one or more electric motors and/or an engine. The vehicle 100 may include a transmission and/or other types of gearing devices configured to transfer torque to one or more wheels of the vehicle 100 from the engine and/or the electric motor(s).

One or more seats 108 are located within the passenger cabin 104. Occupants of the vehicle 100 may sit on the seats 108. While the example of the vehicle 100 including four seats is provided, the present application is also applicable to greater and lesser numbers of seats. The vehicle 100 may be a sedan, a van, a truck, a coupe, a utility vehicle, boat, airplane, or another suitable type of land, air, or water based vehicle. The present application is also applicable to the vehicle 100 being a public transportation vehicle, such as a bus, a train, tram, street car, or another suitable form of transportation.

A driver sits on a driver's seat, such as 108-1. A driver may actuate an accelerator pedal to control acceleration of the vehicle 100. The driver may actuate a brake pedal to control application of brakes of the vehicle 100. The driver may actuate a steering wheel to control steering of the vehicle 100. In various implementations, the vehicle 100 may be an autonomous vehicle or a semi-autonomous vehicle. In autonomous vehicles and semi-autonomous vehicles, acceleration, braking, and steering may be at least at times controlled by one or more control modules of the vehicle 100, such as based on data captured by one or more sensor and/or cameras configured to capture data around the vehicle.

A camera 112 is disposed to capture images including eyes, heads, faces, and upper torsos of users (occupants) of the vehicle 100, such as the driver. The camera 112 may be, for example, an infrared (IR) camera, such as a near IR (NIR) camera, or another suitable type of camera. The camera 112 has a predetermined field of view (FOV). An example FOV is illustrated by 116 in FIG. 1. The driver's seat (e.g., 108-1) is disposed within the predetermined FOV of the camera 112. One or more of the seats 108 may also be located within the predetermined FOV of the camera 112. In various implementations, the camera 112 may be disposed on the vertical top of a steering wheel. The camera 112 may be infrared camera or another suitable type of camera. In various implementations, the camera 112 may include a depth component, such as a red green blue depth (RGB-D) camera.

Figure 2:
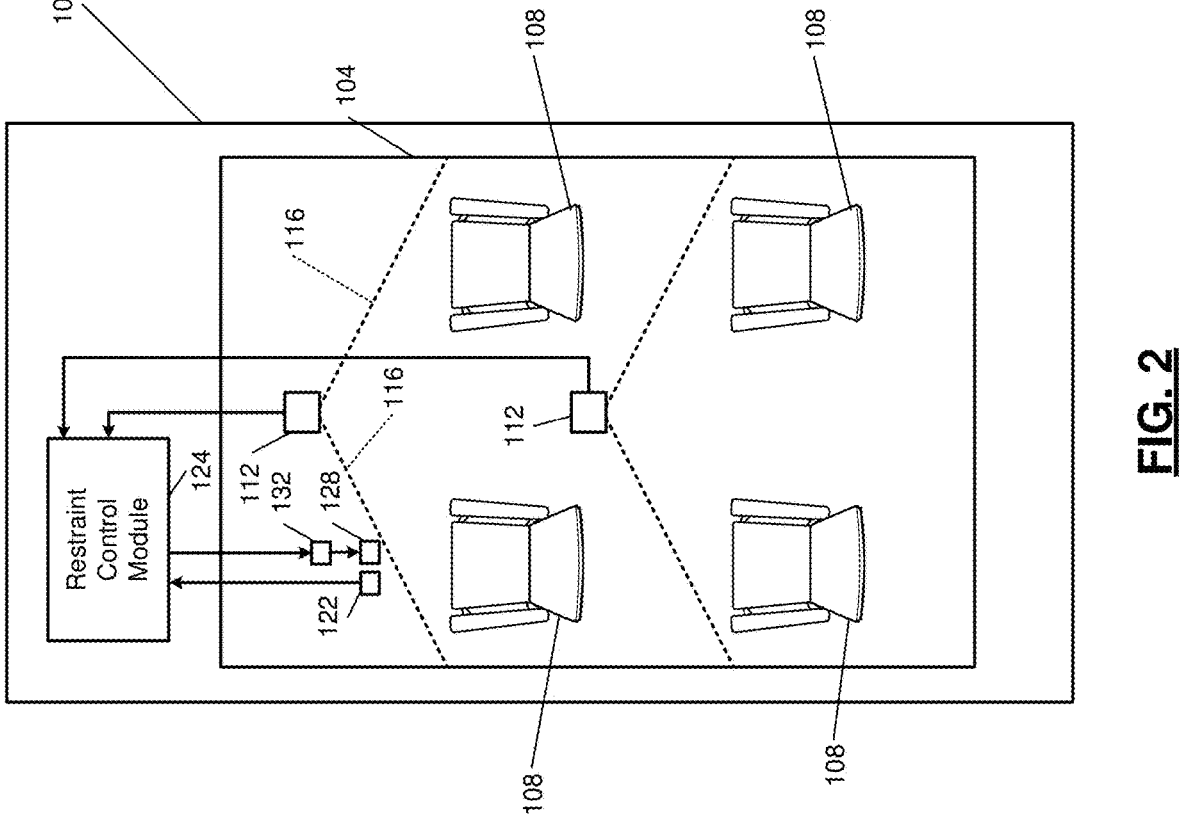
Figure 3:
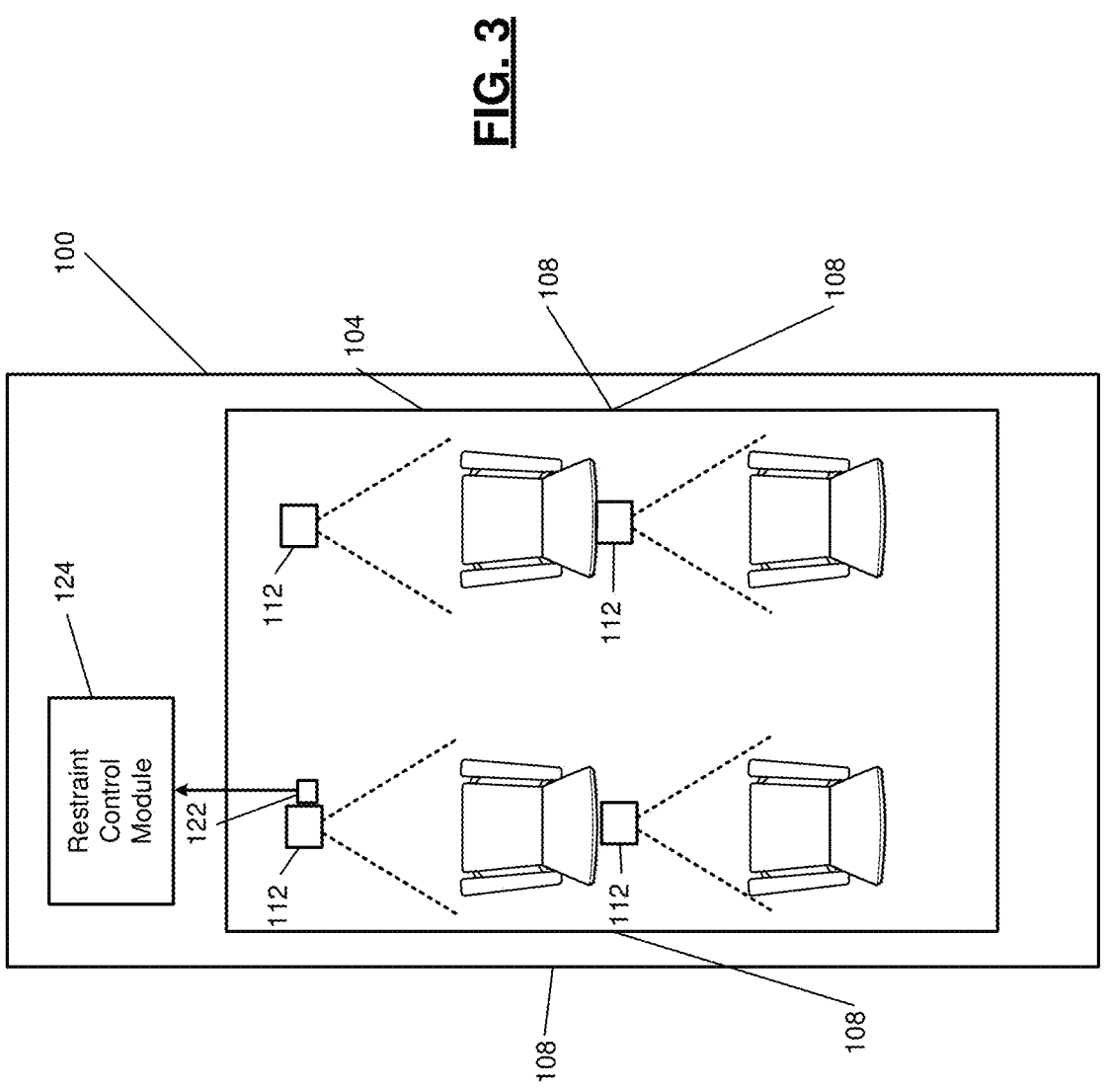

While the example of one camera is provided, one camera may capture images of users in front seats of the vehicle, and one camera may capture images of users in rear seats of the vehicle 100, such as shown in the example of FIG. 2. Alternatively, one camera may be provided per seat to capture images of users in that seat, such as shown in the example of FIG. 3.

In various implementations one or more other cameras may be included, for example, to detect and locate users, heads, faces, eyes, etc. While the example of passengers sitting in seats is provided, the present application is also applicable to passengers that are standing and in other orientations in vehicles.

One or more other types of sensors are also included. For example, a radar sensor 122 may also be included. The radar sensor 122 may output radar signals toward the driver's seat (e.g., 108-1) and receive signals reflected back to the radar sensor 122. One or more parameters of the driver (e.g., height and weight) may be determined based on the received signals. The radar sensor may be, for example, a 77 gigahertz radar sensor or have one or more other suitable frequencies. In various implementations, one radar sensor may be provided per seat (e.g., like the cameras 112 in the example of FIG. 3) or per row (e.g., like the cameras 112 in the example of FIG. 2.), or for the entire vehicle (e.g., like the camera 112 in the example of FIG. 1).

A restraint control module 124 controls deployment of restraints of the vehicles, such as when a collision of the vehicle is detected. An example restraint 128 is illustrated in FIG. 2 in association with the driver's seat 108. One or more restraints may be provided for each seat. Examples of restraints include air bags and other types of restraints.

A restraint actuator 132 actuates the restraint 128 in response to input from the restraint control module 124. The restraint 128 and the restraint actuator 132 are not shown in FIGS. 1 and 3 for simplicity of the drawings but would be included. Also, while only the restraint 128 is shown, one or more restraints may be included per seat. Additional restraints for two or more seats may also be implemented.

The restraint control module 124 controls deployment (e.g., force, timing, etc.) of the restraints, such as based on input from the camera 112 and radar signals from a radar sensor 122. While the example of restraint control is provided, the present application is also applicable to other uses, such as occupant monitoring, driver monitoring, seatbelt detection, and nanny monitoring systems of vehicle.

Figure 4:
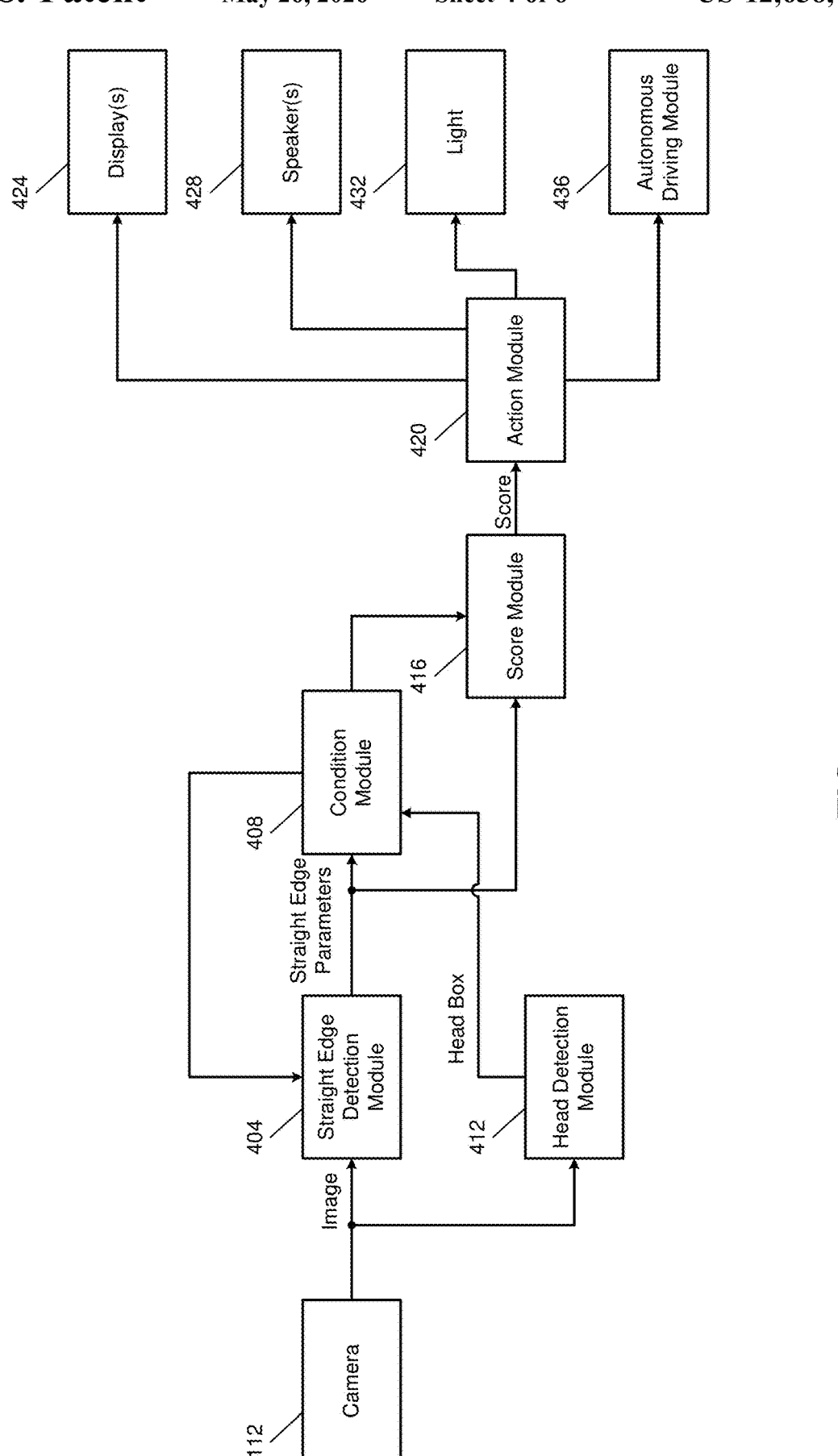
FIGS. 4 and 5 are example perspective views of a camera.

FIG. 4 is a functional block diagram of an example implementation of an optical quality scoring and action system of a vehicle. The camera 112 captures images as discussed above. While the example of the camera 112 capturing the driver is provided and will be discussed, the present application is also applicable to other cameras.

Figure 5:
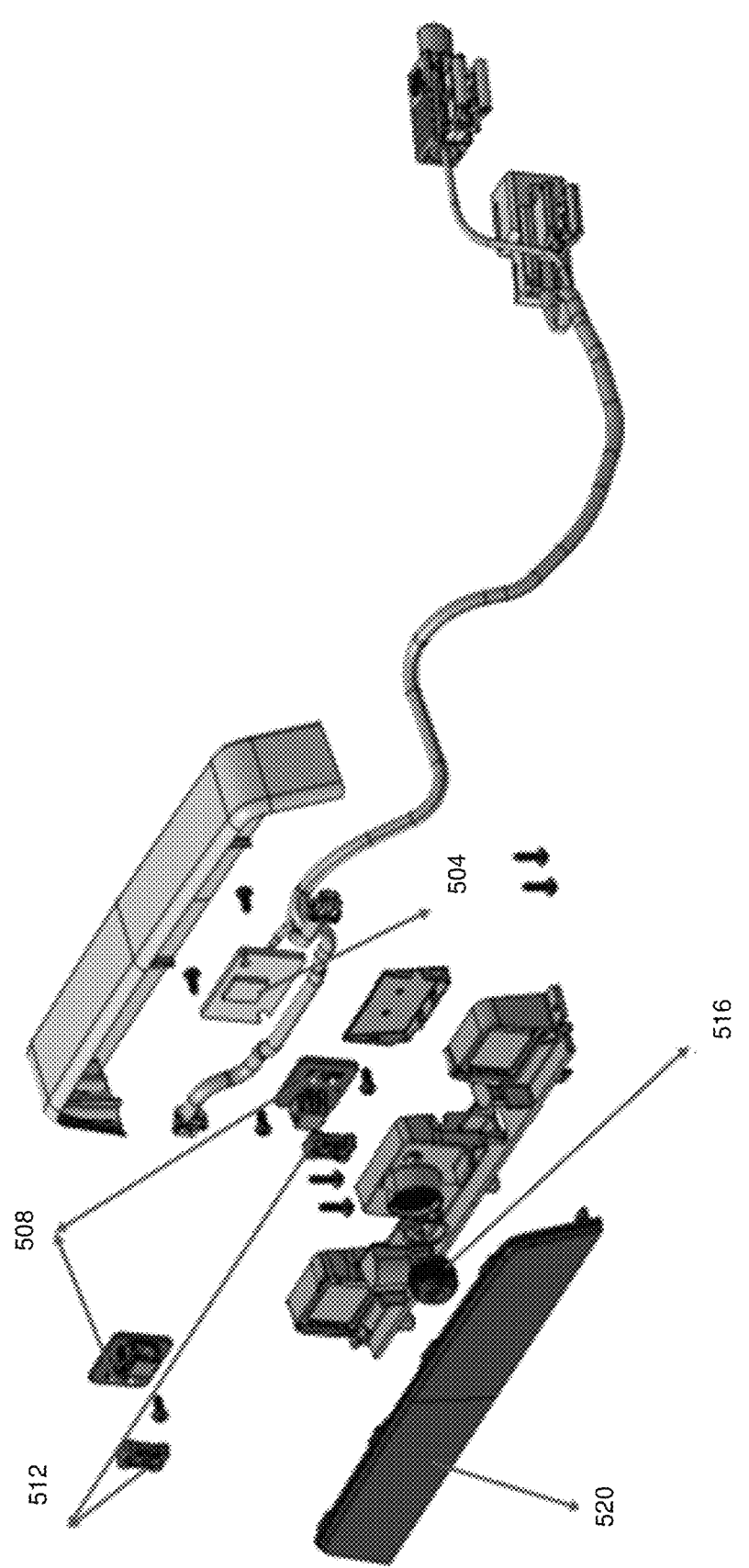
Figure 6:
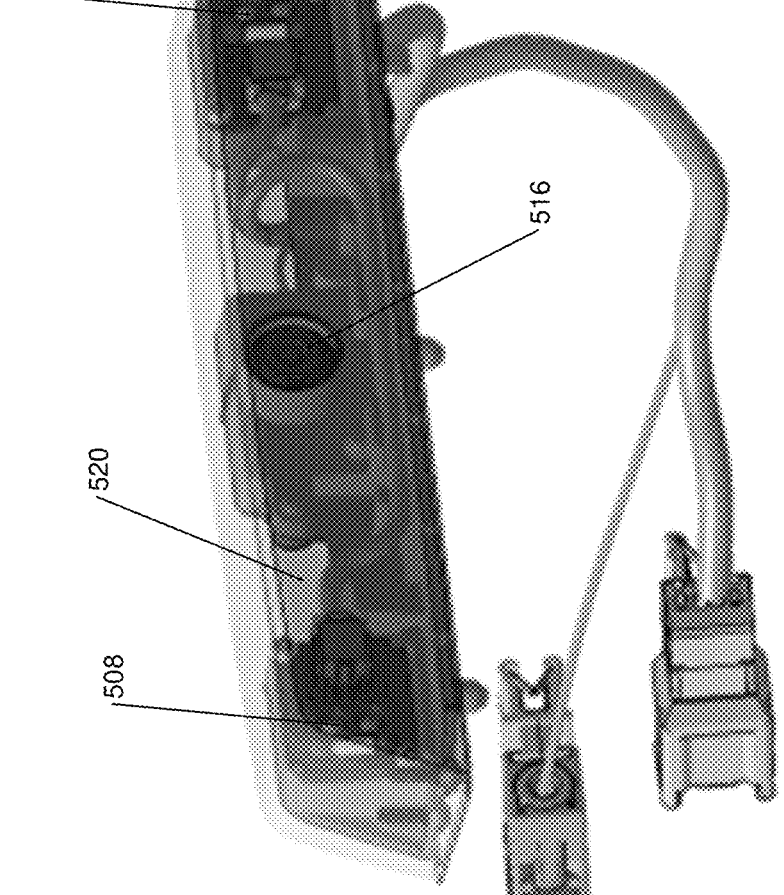
FIG. 6 is a functional block diagram of an example implementation of an optical quality scoring and action system.

FIG. 5 includes an example perspective exploded view of the camera 112, and FIG. 6 includes an example perspective constructed view of the camera 112. The camera 112 includes an imager 504 that captures the images. One or more infrared (IR) light sources, such as light emitting diodes (LEDS) may be included, such as 508. One or more reflectors, such as 512, may also be included. The imager 504 captures images through a lens 516. The imager 504 may capture images additionally through one or more covers and/or filters, such as filter 520. The optical quality of the imager 504 may be unknown. One or more components through which the imager 504 captures images (e.g., via IR light) may also affect the optical quality of the imager 504.

Referring back to 504, a straight edge detection module 404 detects straight edges captured in an image from the camera 112. When a straight edge is detected, the straight edge detection module 404 sends parameters of that straight edge (straight edge parameters) to a condition module 408. The condition module 408 determines whether the straight edge satisfies one or more predetermined conditions. If not, the straight edge detection module 404 detects another straight edge, sends the straight edge parameters of that straight edge, and this process continues until a straight edge that satisfies the predetermined condition(s) is detected.

Examples of the predetermined conditions include (a) a pixel resolution of the straight edge having at least a predetermined pixel resolution, (b) an angle of the straight edge being within a predetermined angle range, and (c) a contrast ratio across the straight edge (e.g., a pixel on one side of the straight edge and a pixel on the other side of the straight edge, where a line connecting these two pixels is perpendicular to the straight edge) being at least a predetermined contrast ratio. Another optional predetermined condition may be that the straight edge be disposed within a bounding box around a head (head box) of the driver. The predetermined angle range may be, for example, 5 degrees −13 degrees relative to vertical or horizontal or another suitable angle range. The predetermined pixel resolution may be, for example, at least 64 pixels in width by approximately 80-500 pixels in height or another suitable resolution. The predetermined contrast ratio may be, for example, 4:1 or another suitable contrast ratio. The predetermined conditions may be defined by one or more standards, such as the International Organization for Standardization (ISO) standard 12233:2017, ISO standard 12233:2023, or newer or older or another standard.

A head detection module 412 detects the head of the driver (e.g., using an object detection algorithm) and determines the head box based on the head of the driver. The condition module 408 outputs an indicator to a score module 416 when a detected straight edge satisfies the predetermined condition(s).

The score module 416 determines a score for the straight edge satisfying the predetermined condition(s). The score corresponds to the optical quality of the image captured by the camera 112. The score module 416 determines the score based on one or more parameters of the straight edge, such as using an equation and/or a lookup table that relates the parameter(s) of the straight edge to scores. In various implementations, the score may be expressed as a value between 0 and 1 where increasing score value indicates increasing optical quality and decreasing score value indicates decreasing optical quality. How to determine the score may be dictated by the standard, such as the 12233:2017, ISO standard 12233:2023, or newer or older or another standard.

For example, the score module 416 may determine the score using the following

Selection of region of interest (ROI):

Here, the region which includes the edge is detected. This selected area has "r" rows and "p" pixels.

Point to Line to Edge: It is hard to obtain the Point Spread Function (PSF) of a camera/lens system just by capturing a single point because of the size and intensity of the target, imagine a single star against a black sky—it would be too faint with a lot of noise. In order to increase the intensity and get rid of the noise, it would be a better idea to capture several lines of adjacent stars which will create a white edge against a dark background, assuming the imaging system is linear.

From Digital values to Edge Spread Function (ESF): The ROI is converted to an image of the intensities along the edge via the Optoelectronic conversion function (OECF) and Chroma coefficients (a,b,c, etc), as shown in equation 1. Each row of the image estimated the ESF of the camera.

$$\varphi(p,r) = a\ \text{OECF}[DN_{chroma\ A}] + b\ \text{OECF}[DN_{chroma\ B}] + c\ \text{OECF}[DN_{chroma\ C}] \qquad \text{Equation 1}$$

DN is the digital output level (0-255). (p,r) is the index of each pixel, where "r" are rows and "p" are pixels. For RGB and RCC images Chroma A, B and C values are defined differently for Eq.1.

From ESF to Line Spread Function (LSF): ESF for each row is then discretely differentiated to form the discrete LSF (Line Spread Function).

The centroid for the LSF of each row is then found along a continues variable x, while x has a range 1 to X, see Eq.2.

$$C(r) = \frac{\sum_{p=1}^{P-1} p[\varphi(p+1,r) - \varphi(p,r)]}{\sum_{p=1}^{P-1} [\varphi(p+1,r) - \varphi(p,r)]} \qquad \text{Equation 2}$$

The best-fit line through each of these centroids is calculated, and the slope is computed using Eq.3.

$$m = \left\lceil \overline{\frac{\Delta C(r)}{\Delta r}} \right\rceil \qquad \text{Equation 3}$$

The slope of this line is useful to calculate the shift (Eq.4) applied to each row in order to bring each ESF to coincidence around a mutual origin.

$$S = \frac{R/2 - r}{m} \qquad \text{Equation 4}$$

Supersampling

Sampling of an image or ROI at a higher frequency than the target sampling frequency, followed by an averaging down to the true pixel size value. The averaged value has more details about the image taken than the image taken at the camera resolution. This method is used for removing aliasing. The Supersampling process creates a re-quantized ESF over a discrete variable "j", which "j" is 4 times more sampled than "p". This means the super sampling factor is 4, which tell us that 4PX bins are created while each have a width of ¼ of "P" and the averaging is carried out (Eq.5). Other factors can be used.

$$ESF(j) = \frac{\sum_{r=1}^{R} \sum_{p=1}^{P} \varphi(p,r) \cdot \alpha(p,r,j)}{\sum_{p=1}^{P} \alpha(p,r,j)} \qquad \text{Equation 5}$$

Where "a" is a counting function, it also decides to exclude or include a value in a bin, Eq.6.

$$\begin{cases} 1 - 0.125 & \leq [p - S(r) - j] \\ 0 & \text{Elsewhere} \end{cases} \qquad \text{Equation 6}$$

The average Supersampled ESF is differentiated and windowed which gives us the LSF (Eq.7). It is worth mentioning that the calculation of the first and last values of the LSF is repeated which gives the length of 4P [4X].

$$LSF_j' = W(j) \frac{ESF(j+1) - ESF(j-1)}{2}, j = 2, \dots, N-1 \qquad \text{Equation 7}$$

-continued

Where $$W(j) = 0.54 + 0.46\cos\left[\frac{2\pi(j - 2X)}{4X}\right] \qquad \text{Equation 8}$$

A final step is to take the Discrete Fourier Transform of the windowed LSF which is done by substituting the results from step into Eq.9 and then taking the modulus of the result, which gives us the MTF (or e-SFR (f), f=k/X).

$$MTF(f) = D(k)\left|\frac{\sum_{j=1}^{N} LSF_w'(j)e^{-\frac{i2\pi jk}{N}}}{\sum_{j=1}^{N} LSF_w'(j)}\right|, \qquad \text{Equation 9}$$

$$\text{for } k = 0, 1 \ldots, \frac{N}{2} \text{ or } \frac{N+1}{2} \text{ for odd } N$$

To calculate the MTF of the system, images may be taken at a rate of 'x' frames/see, in 4 different ROIs per BOX. Other numbers may be used.

$$MTF = \frac{MTF_1 + MTF_2 + MTF_3 + MTF_4}{x} \qquad \text{Equation 10}$$

The MTF (score) is then averaged and plotted vs spatial frequency, which is normalized by the zero-frequency value.

The MTF is measured from 0 to 0.8 (it idealistically [diffraction limited] goes from 0 to 1). The MTF is measured from 0 spatial frequency to ¼th of the Nyquist frequency. For example, if we have a camera sensor 1280*960 pixels, which gives us 1600 pixels, radially. Which means we have 800 lps (line pairs) radially. If we multiply the pixel pitch (we have from the spec sheet of the sensor) which is $3.75*10^{-3}$ mm, by 800 radial line-pairs, we find out that the radius of the sensor is 6 mm. When we divide the radial line-pairs by the radius of the sensor we get the Nyquist Frequency to be 133.3 lppm. As it is possible for a zero score to occur during scoring due to distortion and rotational error, zero scores may not be included in the field of view region average or Pass/Fail criteria.

An action module 420 may selectively take one or more actions based on the score. For example, the action module 420 may take one or more actions when the score is less than a predetermined value. In the example of score values being between 0 and 1, the predetermined value may be, for example, 0.4 or another suitable value. As an example, the action module 420 may indicate that a fault is present when the score is less than the predetermined value. The action module 420 may indicate that a fault is not present when the score is greater than the predetermined value.

The action module 420 may, for example, when the score is less than the predetermined value at least one of (a) visually output an indicator on one or more displays 424 and (b) audibly output an indicator via one or more speakers 428. The indicator may be, for example, to clean the camera 112 or that a fault is associated with the camera 112. In various implementations, the action module 420 may turn on one or more indicator lights 432 when the score is less than the predetermined value. In various implementations, the action module 420 may disable an autonomous driving module 436 when the score is less than the predetermined value. When enabled, the autonomous driving module 436 may autonomously or semi-autonomously navigate the vehicle and avoid objects based on one or more inputs and without driver input. When disabled, the autonomous driving module 436 may not autonomously or semi-autonomously navigate the vehicle and movement of the vehicle may be controlled based on inputs from the driver (e.g., steering wheel actuation, accelerator pedal actuation, brake pedal actuation, etc.).

Figure 7:
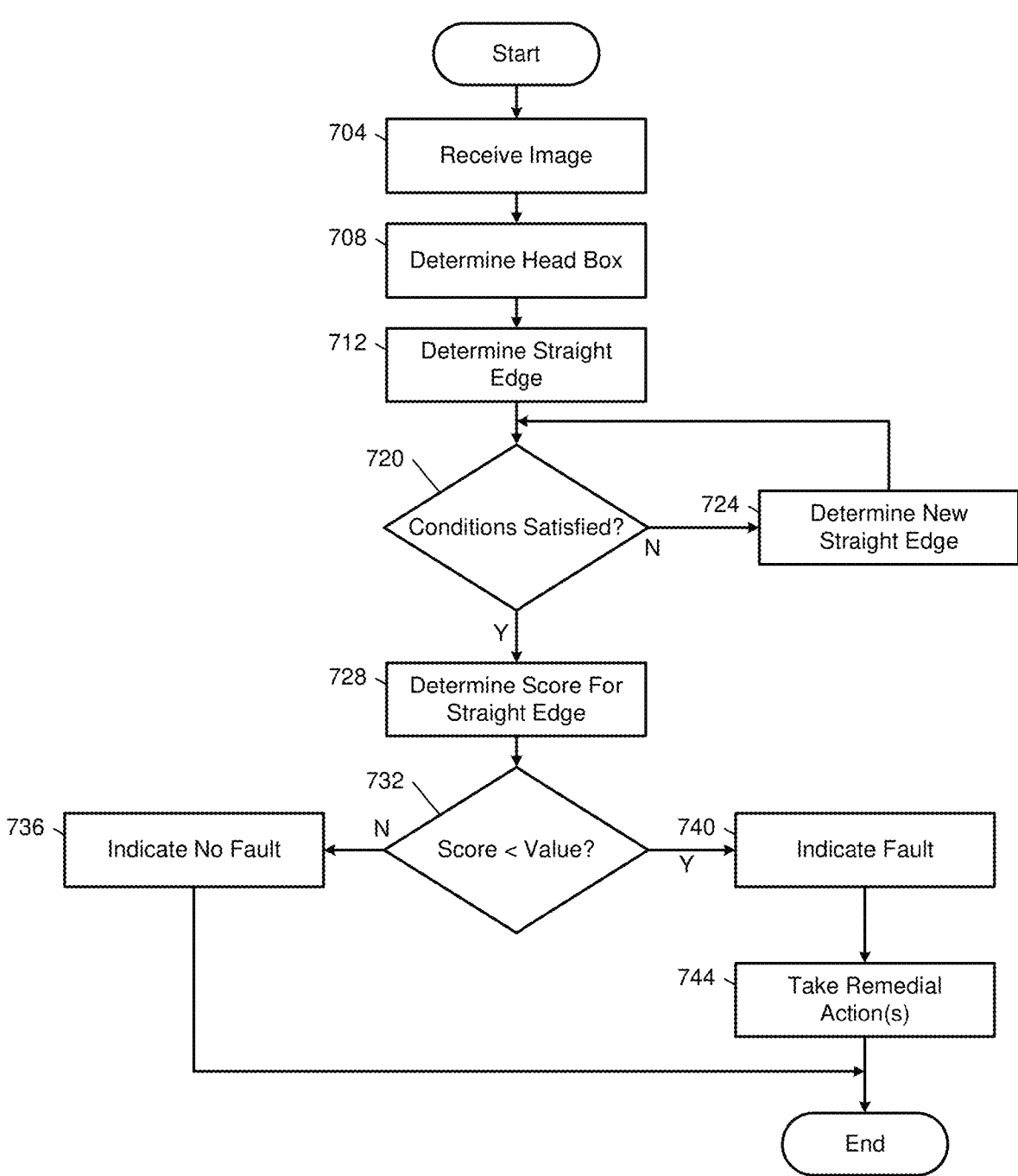
FIG. 7 is a flowchart depicting an example method of scoring the optical quality of the camera.

FIG. 7 is a flowchart depicting an example method of scoring the optical quality of the camera 112. Control begins with 704, such as at vehicle startup during assembly. At 704, the camera 112 captures an image and the straight edge detection module 404 receives the image.

Figure 8:
FIG. 8 includes an example image captured using a driver facing camera.

At 708, optionally the head detection module 712 may determine the head box (bounding box around the head of the driver). At 712, the straight edge detection module 404 detects a straight edge in the image. FIG. 8 includes an example image captured using a driver facing camera. An example straight edge is included within the rectangle. In this example, the straight edge is of an opening for a seat belt along an B pillar of the vehicle.

At 720, the condition module 408 determines whether the detected straight edge satisfies (e.g., all of) the predetermined condition(s). For example, the condition module 408 may determine whether the detected straight edge has the predetermined pixel resolution, within the predetermined angle range, and has the predetermined contrast ratio. The condition module 408 may also determine whether the detected straight edge is within the head box. If 720 is false, the condition module 408 may prompt the straight edge detection module 404 to detect another straight edge at 724, and control may return to 720. If 720 is true, control continues with 728.

At 728, the score module 416 determines the score for the detected straight edge that satisfies the predetermined condition(s). At 732, the action module 732 determines whether the score for the detected straight edge is less than the predetermined value. If 732 is false, the action module 732 may indicate that no fault (e.g., optical clarity fault) is present at 736 and not take action, and control may end. If 732 is true, control may continue with 740. At 740, the action module 732 may indicate that a fault (e.g., an optical clarity fault of the camera 112) is present. At 744, the action module 744 may take one or more actions, such as visually outputting an indicator on a display, audibly outputting an indicator via one or more speakers, turning on a light, and disabling autonomous driving.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A camera system of a vehicle, comprising:
   a camera within a passenger cabin of the vehicle and configured to capture an image including an occupant of a seat within the passenger cabin;
   a straight edge detection module configured to detect a straight edge in the image;
   a score module configured to determine a score for the straight edge, the score corresponding to an optical quality of the camera,
   wherein the score module is configured to determine the score using at least one of (a) one or more equations that relate parameters of the straight edge to scores and (b) one or more lookup tables that relate parameters of the straight edge to scores; and an action module configured to take one or more actions when the score is less than a predetermined value.

2. The camera system of claim 1 wherein the score module is configured to determine the score based on parameters of the straight edge.

3. The camera system of claim 2 wherein the parameters include a pixel resolution of the straight edge.

4. The camera system of claim 2 wherein the parameters include an angle of the straight edge.

5. The camera system of claim 2 wherein the parameters include a contrast ratio of pixels across the straight edge.

6. The camera system of claim 5 wherein the contrast ratio is between (a) a first pixel on one side of the straight edge and (b) a second pixel on the other side of the straight edge.

7. The camera system of claim 6 wherein the first and second pixels form a line that intersects the straight edge at one point.

8. The camera system of claim 7 wherein the line is perpendicular to the straight edge.

9. The camera system of claim 1 wherein the score module is configured to determine the score for the straight edge in response to a determination that the straight edge satisfies predetermined conditions.

10. The camera system of claim 9 wherein one of the predetermined conditions includes a pixel resolution of the straight edge being greater than a predetermined resolution.

11. The camera system of claim 9 wherein one of the predetermined conditions includes an angle of the straight edge being within a predetermined angle range.

12. The camera system of claim 9 wherein one of the predetermined conditions includes a contrast ratio across the straight edge being greater than a predetermined ratio.

13. The camera system of claim 1 wherein the action module is configured to, when the score is less than the predetermined value, visually output an indicator of a fault on a display.

14. The camera system of claim 1 wherein the action module is configured to, when the score is less than the predetermined value, audibly output an indicator of a fault via a speaker.

15. The camera system of claim 1 wherein the action module is configured to, when the score is less than the predetermined value, turn on an indicator light visible within a passenger cabin of the vehicle.

16. The camera system of claim 1 wherein the action module is configured to, when the score is less than the predetermined value, disable autonomous navigation of the vehicle.

17. The camera system of claim 1 wherein the camera is an infrared (IR) camera.

18. A camera optics method for a vehicle, comprising:

by a camera within a passenger cabin of the vehicle, capturing an image including an occupant of a seat within the passenger cabin;

detecting a straight edge in the image;

determining a score for the straight edge, the score corresponding to an optical quality of the camera, wherein determining the score includes determining the score using at least one of (a) one or more equations that relate parameters of the straight edge to scores and (b) one or more lookup tables that relate parameters of the straight edge to scores; and taking one or more actions when the score is less than a predetermined value.

19. A camera system of a vehicle, comprising:

a camera within a passenger cabin of the vehicle and configured to capture an image including an occupant of a seat within the passenger cabin;

a straight edge detection module configured to detect a straight edge in the image;

a score module configured to determine a score for the straight edge, the score corresponding to an optical quality of the camera, wherein the score module is configured to determine the score for the straight edge in response to a determination that the straight edge satisfies predetermined conditions; and an action module configured to take one or more actions when the score is less than a predetermined value.

* * * * *